Figure 1:
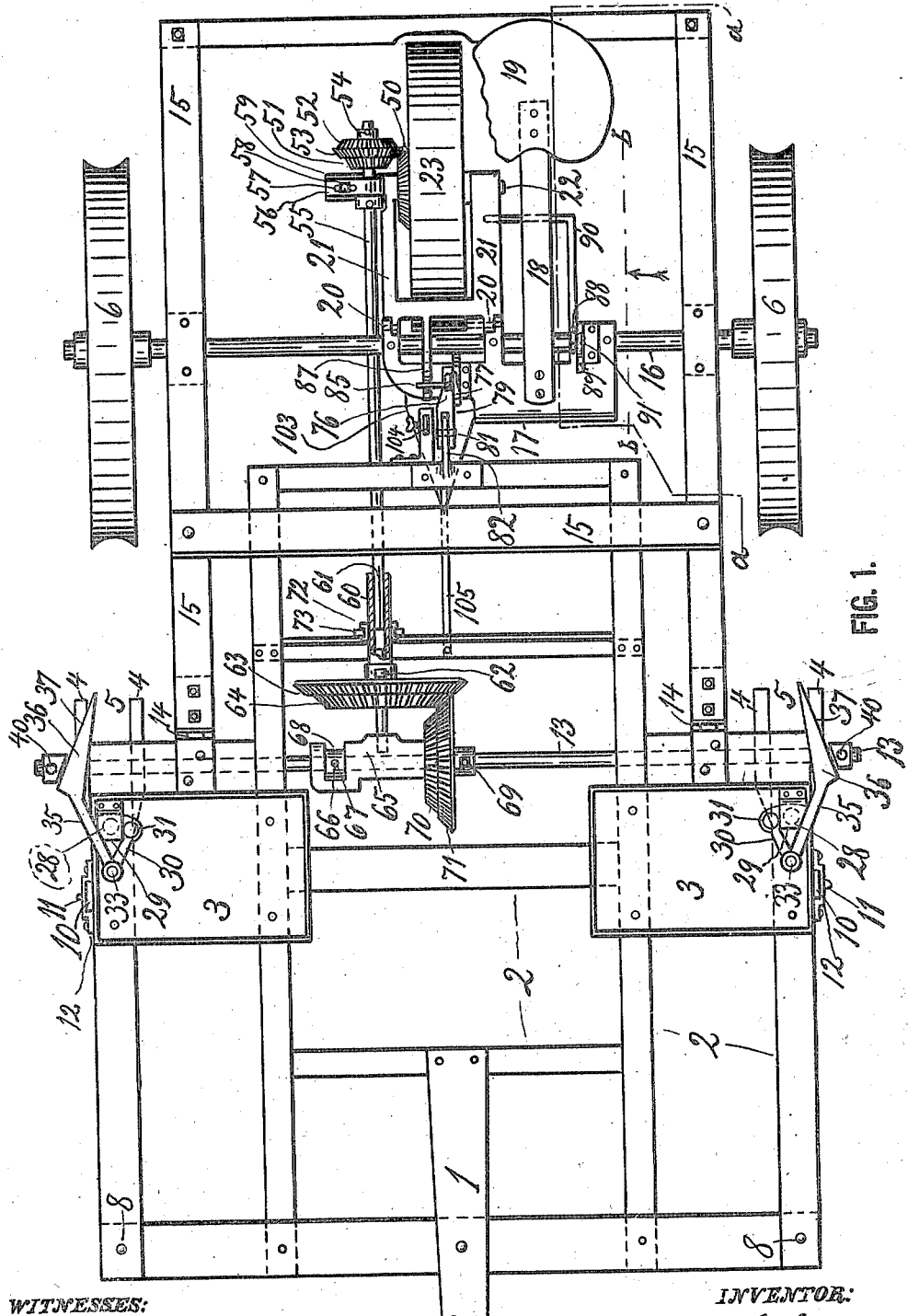

J. C. COLEMAN.
CORN PLANTER.
APPLICATION FILED MAR. 23, 1909.

947,800.

Patented Feb. 1, 1910.

2 SHEETS—SHEET 1.

WITNESSES:
D. E. Carlsen.
M. M. Carlsen.

INVENTOR:
Joseph C. Coleman.
BY HIS ATTORNEY:
A. M. Carlsen.

J. C. COLEMAN.
CORN PLANTER.
APPLICATION FILED MAR. 23, 1909.
947,800.
Patented Feb. 1, 1910.
2 SHEETS—SHEET 2.
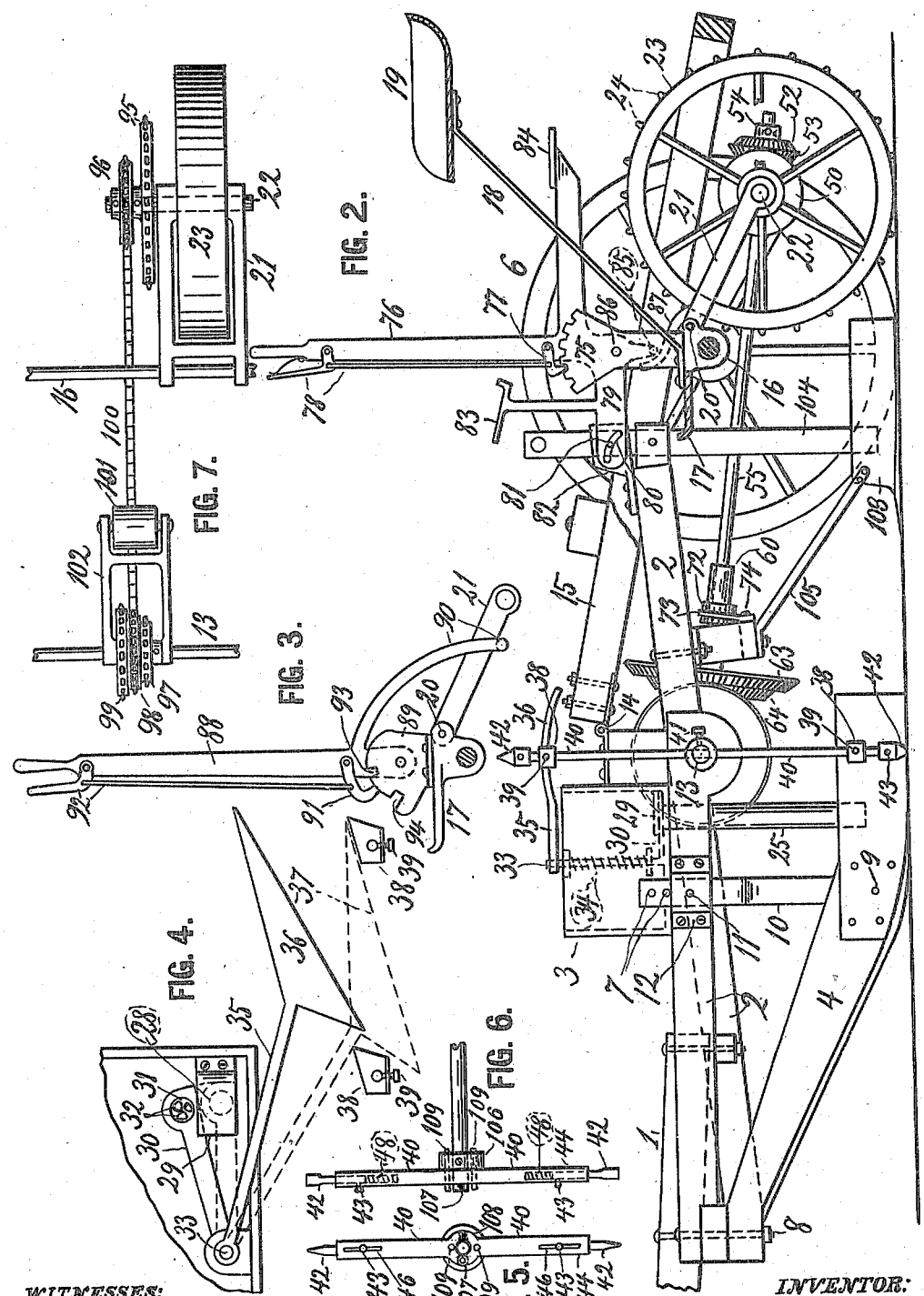
WITNESSES:
D. E. Carlsen.
N. M. Carlsen.
INVENTOR:
Joseph C. Coleman
BY HIS ATTORNEY:
A. M. Carlsen.

UNITED STATES PATENT OFFICE.

JOSEPH C. COLEMAN, OF NEW ALBIN, IOWA.

CORN-PLANTER.

947,800.  Specification of Letters Patent.  Patented Feb. 1, 1910.

Application filed March 23, 1909. Serial No. 485,242.

*To all whom it may concern:*

Be it known that I, JOSEPH C. COLEMAN, a citizen of the United States, residing at New Albin, in the county of Allamakee and State of Iowa, have invented a new and useful Corn-Planter, of which the following is a specification.

My invention relates to corn planting machines of the class having a space wheel rolling on the ground and operatively connected with the seed dropping mechanism so as to drop seed, especially corn, at certain intervals, which are determined by the distance said wheel has rolled forward.

The invention is an improvement on the machine described in my application for patent in the United States, Serial No. 455,069, filed September 28—1908.

Among other objects in view one is to so improve my invention that it will be more applicable to cornplanters already built and most of which are so constructed that there is no room for a spacing wheel within the front or hopper frame, wherefore said wheel must be mounted in the rear frame and still rotate the shaft in the front frame by which the markers and the dropping mechanisms are operated.

In the accompanying drawings, Figure 1 is a top or plan view of my improved planter with the parts 83 and 84 in Fig. 2 omitted. Fig. 2 is a sectional side elevation on the line *a—a* in Fig. 1. Fig. 3 is a sectional side elevation on line *b—b* in Fig. 1, showing certain parts that would have been obstructive in Fig. 2. Fig. 4 is an enlarged portion of Fig. 1. Fig. 5 is a modification of the marking device in Fig. 2. Fig. 6 is a right hand side view of Fig. 5. Fig. 7 is a top view of a modification of the means that transmit rotary motion from the spacing wheel to the front shaft.

Referring to the drawings by reference numerals, a draft pole 1 is rigidly fixed to a front frame 2, also known as the hopper frame since the corn hoppers 3 are mounted on it. Said frame is provided with and supported on runners or furrow-openers 4, having each in its rear end a gap 5, through which the corn is dropped into the furrow from the tube 25 which extends downward from the bottom of the hopper above it.

Each runner has its front end pivoted at 8 to the front corner of the frame and is farther back pivoted at 9 to a vertical post 10, which is adjustable vertically by means of a horizontal pin 11 passed through a guiding bracket 12 on the frame and through one of several holes 7 in the post.

The seed or corn is dropped through the tubes 25 by a mechanism constructed and operated as follows:

In the bottom of each hopper is an aperture 28 (see Figs. 1 and 4) directly above the tube 25 and covered by a plate or cut-off 29 secured at one end to the hopper bottom and standing say about one-third of an inch above the bottom. Between this plate and the hopper bottom swings horizontally a flat arm or carrier 30 having an aperture 31 adapted to receive a few grains of corn 32 and carry the same in under the plate and drop them into the tube 25. The arm 30 is operated by being secured on a vertical rock shaft 33 journaled in one side of the hopper and provided with a spring 34 tending at all times to turn the shaft with the arm 30 over the feed tube 25. To the upper end of the rock shaft is fixed a rocker arm 35 carrying a cam 36 having an inclined face 37, against which acts a block 38 held by a screw 39 near each end of a bar 40, which is passed transversely through the adjacent end of the shaft 13 and secured therein by a screw 41 so as to form two radial arms. Said block 38 moves or swings the cam arm inward and allows the corn to fall into the aperture 31, and as the block or finger 38 passes the broad end of the cam the spring swings the arm quickly into position for dropping the corn, and at the same time a mark is made in the ground by the lower end of the rod 40, or rather by a prong 42 (see Fig. 5) which is preferably wedge-shaped at its outer end and has its inner end slidingly inserted in the socket-shaped end 44 of the marker arm 40, in which it is resisted by a spring 48 but retained against the force of the spring by a lateral pin 43 secured in it and moving in a slot 46 in the side of the socket. By this arrangement, if the prong 42 strikes a stone or other hard object the spring 48 will yield and save the prong from getting broken or damaged. The marks thus made by the prongs 42 serve to guide the operator as to the position the planter and its planting mechanism is to occupy in starting the next row on the field, so that the plants will be arranged in straight rows in transverse position to the rows planted by driving the machine over the field. The width between the latter rows is determined by the width between the runners 4 and also by the distance from either runner to the usual marker (not shown) that is dragged by the machine on the ground the desired distance from either side thereof, and the distance between the transverse rows is regulated by the speed at which the shaft 13 is rotated, and said speed is produced and regulated by mechanisms contained in the following description:

Near the shaft 13 is pivotally attached by hinges 14 side bars of a rear frame 15, which is mounted on an axle 16 and the usual grooved supporting wheels 6, by which the furrows are closed in upon the seeded corn. On the axle 16 is fixed a preferably metallic frame 17, on which is mounted by an arm 18 a driver's seat 19. To the rear edge of the frame 17 is pivoted at 20, to swing up and down a U-shaped frame 21, in whose legs are journaled the ends of a shaft 22, near the middle of which is fixed a space wheel 23, which may have cleats 24 (shown in Fig. 2). At one side of the space wheel is fixed a bevel gear 50, adjustable for engagement with either one of three bevel-gears 51—52—53, preferably secured together and held by a set screw 54 on a shaft 55, which is journaled in a bearing 56, having a slotted hole 57 through which is passed a cap-screw 58 tapped into an extension 59 of the frame 21, so that the bearing 56 may be adjusted to and from the frame according to the slight variation in diameter of the three bevel gears.

The front portion of shaft 55 is provided with a slidable joint formed by an angular socket 60 and an angular end 61 of the shaft engaging therein; and beyond said joint is secured by a set-screw 62 a double bevel gear 63—64, and the end of the shaft is journaled in a bearing 65, in which also the shaft 13 rotates and forms the support for the bearing; to prevent longitudinal motion of the bearing on shaft 13 the bearing is formed with a gap 68 in which a collar 66 is secured upon the shaft by a set-screw 67.

On the shaft 13 is secured by a set screw 69 a double bevel gear 70—71. The slidable joint 60—61 is to allow for variation in the length of the shaft 55 when the U-shaped frame 21 swings up or down or when the front frame is raised and lowered, as will presently be described. The socket 60 is provided with a grooved collar 72 in which engages a fork 73, fixed at 74 to the frame work and serves to retain the front end of the shaft in the bearing 65.

Upon the frame 17 is pivoted at 86 to a toothed sector 75 (see Fig. 2) a hand lever 76 having a dog 77 engaging in the sector and controlled by a finger lever 78 pivoted on the hand-lever. The latter lever is formed with a forward arm 79, having a slot 80 engaging a pin 81 in a rearward extension 82 of the front frame 2. The lever also has a foot rest 83 and a rearwardly extended pedal 84 and a lateral pin 85 below its fulcrum 86. Said pin engages the upper side of an inclined arm 87 fixed on the U-shaped frame 21, so that whenever the driver pulls the lever 76 rearwardly to raise the front frame while the machine turns to the right or left, the space wheel 23 is also raised from the ground by the action of the pin. The pedal 84 is to enable the driver to operate the lever by both hand and foot.

To the left side of the driver's seat is mounted by a sector 89 another hand lever 88, (see Fig. 3) which has a curved arm 90 engaging the under side of the U-shaped frame so as to raise it and the spacing wheel when the lever is swung forward. On the lever is pivoted a dog 91 controlled by a finger lever 92 and normally engages a notch 93, leaving the arm 90 clear of the frame 21 but when the dog is placed in the notch 94 the said frame and by it the space wheel is held clear of the ground. Thus by the left side lever the spacing wheel may be raised and thereby the dropping mechanism stopped for a shorter or longer period without raising the front frame, and by means of the right hand lever both the front frame and the spacing wheel are raised simultaneously.

In the modification shown in Fig. 7, I substitute for the bevel gears and shaft 55 in Fig. 1, rear sprockets 95, 96 on the shaft 22, and the front sprockets 97, 98, 99 on the front shaft 13, and connect by a link belt 100 one of the rear sprockets with one of the front sprockets. Said link belt is stretched by a belt stretcher composed of a roller 101 carried by a yoke 102, which is pivotally mounted on the shaft 13 though it may as well be mounted on other parts of the machine. In said view is also shown how the frame 21 may be pivotally mounted on the axle 16 instead of to a frame secured on said axle, as in Fig. 1.

In front of the space wheel is a ground leveling device 103, held by an arm 104 which is adjustable vertically in the rear portion of the front frame to which it is also braced by a forwardly inclined brace 105. This device serves to level the ground before the space wheel enters upon it, as is more fully set forth in my former application above referred to. In said application the space wheel is placed directly on the front shaft or axle and is of such a size that half of its circumference makes about three feet eight inches, which is the standard distance between the hills in corn planting. The distance is however, by some farmers varied a couple of inches above or below the standard, and for the latter reason my former machine requires two or three spacing wheels causing the inconvenience of exchanging them whenever the distance is to be changed, while in the present case I need only one spacing wheel and that one may be conveniently smaller than in the former machine, and by some minor gears I provide for increased and varied speed of the front shaft, as will be understood from the following description involving the operation.

The operation, so far as not already described, will be best understood by looking at Fig. 1. The gears 64 and 71 mesh normally and being of the same diameter the shafts 13 and 55 rotate at the same speed, and they are driven by the bevel gears 52 and 50, of which the latter is sufficiently larger than the driven gear 52, to make the spacing wheel 23 to impart half a turn to the front shaft 13 while the machine moves forward the standard distance between the hills being planted, regardless of the diameter of the spacing wheel, which may be varied to suit the size of the frame work, but should preferably not be smaller than about two feet in diameter. If it be desired to plant the hills a little closer than the standard space apart the speed of the front shaft is slightly increased by moving the smaller gear 51 into contact with gear 50, and if the spacing is to be increased beyond the standard then the largest gear 53, is meshed with gear 50. If it is desirable to use only one of the marking prongs 42 at each end of the front shaft, the speed of the latter shaft is doubled by moving gear 63 in mesh with gear 70, as these gears are one twice as large as the other. This same operation is effected in Fig. 7 by moving the sprocket 98 into the link belt for standard spacing, the sprocket 97 for extra close spacing, and the sprocket 99 for extra wide spacing, and by employing the sprocket 95 for doubling the speed of the front shaft, as said sprocket 95 is just twice as large as sprocket 96. When sprocket 95 is used the link belt is lengthened by adding a portion thereto.

In Figs. 5 and 6 is shown how each end of the front shaft 13 may have a fixed collar 106, between which and a cotter pin 107 an enlargement 108 of the rods or arms 40 revolves on the shaft, and is prevented from revolving by one or more breakable pins 109 inserted through the enlargement and the collar 108 so as to break and save the arm from injury in case it strikes a fence or other obstructions.

Having thus described the invention what I claim is:

1. In a corn planter, a front and a rear frame pivotally secured together, furrow-opening runners supporting the front frame, hoppers supported on said frame and having each a corn dropping mechanism, a shaft journaled across the frame and having at each end one or more radial marking arms and means for operating the dropping mechanism when the marking arm is in contact with the earth operated on, an axle fixed across the rear frame and having at each end a supporting wheel, a frame fixed upon the axle, a frame pivotally connected therewith and extending rearwardly from the axle to swing in a vertical plane, a short shaft journaled in the pivoted frame, a space wheel fixed on the short shaft, and operative connection between the short shaft of the space wheel and the front shaft that operates the markers and the dropping mechanisms, a driver's seat on the rear frame and a lever adjacent thereto for raising the front frame.

2. In a corn planter, a front and a rear frame pivotally secured together, furrow-opening runners supporting the front frame, hoppers supported on said frame and having each a corn dropping mechanism, a shaft journaled across the frame and having at each end one or more radial marking arms and means for operating the dropping mechanism when the marking arm is in contact with the earth operated on, an axle fixed across the rear frame and having at each end a supporting wheel, a frame fixed upon the axle, a frame pivotally connected therewith and extending rearwardly from the axle to swing in a vertical plane, a short shaft journaled in the pivoted frame, a space wheel fixed on the short shaft, and operative connection between the short shaft of the space wheel and the front shaft that operates the markers and the dropping mechanisms, a driver's seat on the rear frame and a lever adjacent thereto for raising the front frame and the frame of the space wheel simultaneously.

3. In a corn planter, a front and a rear frame pivotally secured together, furrow-opening runners supporting the front frame, hoppers supported on said frame and having each a corn dropping mechanism, a shaft journaled across the frame and having at each end one or more radial marking arms and means for operating the dropping mechanism when the marking arm is in contact with the earth operated on, an axle fixed across the rear frame and having at each end a supporting wheel, a frame fixed upon the axle, a frame pivotally connected therewith and extending rearwardly from the axle to swing in a vertical plane, a short shaft journaled in the pivoted frame, a space wheel fixed on the short shaft, and operative connection between the short shaft of the space wheel and the front shaft that operates the markers and the dropping mechanisms, a driver's seat on the rear frame and a lever adjacent thereto for raising the front frame and the frame of the space wheel simultaneously, and a second lever for raising only the frame of the space wheel when so desired.

4. In a corn planter, a front and a rear frame pivotally secured together, furrow-opening runners supporting the front frame, hoppers supported on said frame and having each a corn dropping mechanism, a shaft journaled across the frame and having at each end one or more radial marking arms and means for operating the dropping mechanism when the marking arm is in contact with the earth operated on, an axle fixed across the rear frame and having at each end a supporting wheel, a frame fixed upon the axle, a frame pivotally connected therewith and extending rearwardly from the axle to swing in a vertical plane, a short shaft journaled in the pivoted frame, a space wheel fixed on the short shaft, and operative connection between the short shaft of the space wheel and the front shaft that operates the markers and the dropping mechanisms, a driver's seat on the rear frame and a lever adjacent thereto for raising the front frame, said operative connection being easily variable as to the relative speeds of the two shafts.

5. In a corn planter a front and a rear frame pivotally secured together, furrow-opening runners supporting the front frame, hoppers supported on said frame and having each a corn dropping mechanism, a shaft journaled across the frame and having at each end one or more radial marking arms and means for operating the dropping mechanism when the marking arm is in contact with the earth operated on, an axle fixed across the rear frame and having at each end a supporting wheel, a frame fixed upon the axle, a frame pivotally connected therewith and extending rearwardly from the axle to swing in a vertical plane, a short shaft journaled in the pivoted frame, a space wheel fixed on the short shaft, and operative connection between the short shaft of the space wheel and the front shaft that operates the markers and the dropping mechanisms, a driver's seat on the rear frame and a lever adjacent thereto for raising the front frame, and means automatically allowing for the necessary variation in length of the operative connection between the two shafts.

6. In a corn planter, a front and a rear frame pivotally secured together, furrow-opening runners supporting the front frame, hoppers supported on said frame and having each a corn dropping mechanism, a shaft journaled across the frame and having at each end one or more radial marking arms and means for operating the dropping mechanism, when the marking arm is in contact with the earth operated on, an axle fixed across the rear frame and having at each end a supporting wheel, a frame fixed upon the axle, a frame pivotally connected therewith and extending rearwardly from the axle to swing in a vertical plane, a short shaft journaled in the pivoted frame, a space wheel fixed on the short shaft and operative connection between the short shaft of the space wheel and the front shaft that operates the markers and the dropping mechanisms, a driver's seat on the rear frame and a lever adjacent thereto for raising the front frame, the speed of the two shafts being at all times different.

7. In a corn planter, a front and a rear frame pivotally secured together, furrow-opening runners supporting the front frame, hoppers supported on said frame and having each a corn dropping mechanism, a shaft journaled across the frame and having at each end one or more radial marking arms and means for operating the dropping mechanism when the marking arm is in contact with the earth operated on, an axle fixed across the rear frame and having at each end a supporting wheel, a frame fixed upon the axle, a frame pivotally connected therewith and extending rearwardly from the axle to swing in a vertical plane, a short shaft, journaled in the pivoted frame, a space-wheel fixed on the short shaft, and operative connection between the short shaft of the space wheel and the front shaft that operates the markers and the dropping mechanisms, a driver's seat on the rear frame and a lever adjacent thereto for raising the front frame, and a ground leveling device carried by the front frame near in front of the space wheel in the rear frame.

In testimony whereof I affix my signature, in presence of two witnesses.

JOSEPH C. COLEMAN.

Witnesses:
L. H. GAARDER,
HENRY WUENNERKE.